H. R. HUGHES.
GANG DISK DRILL.
APPLICATION FILED JULY 31, 1915.

1,176,965.

Patented Mar. 28, 1916.
2 SHEETS—SHEET 1.

Inventor,
Howard R. Hughes.
By Bakewell & Church, Attys.

H. R. HUGHES.
GANG DISK DRILL.
APPLICATION FILED JULY 31, 1915.

1,176,965.

Patented Mar. 28, 1916.
2 SHEETS—SHEET 2.

Inventor,
Howard R. Hughes
By Bakewell & Cherre attys

UNITED STATES PATENT OFFICE.

HOWARD R. HUGHES, OF HOUSTON, TEXAS, ASSIGNOR TO HUGHES TOOL COMPANY, OF HOUSTON, TEXAS, A CORPORATION OF TEXAS.

GANG DISK DRILL.

1,176,965.     Specification of Letters Patent.     Patented Mar. 28, 1916.

Application filed July 31, 1915. Serial No. 42,932.

*To all whom it may concern:*

Be it known that I, HOWARD R. HUGHES, a citizen of the United States, residing at Houston, Texas, have invented a certain new and useful Improvement in Gang Disk Drills, of which the following is a full, clear, and exact description, such as will enable others skilled in the art to which it appertains to make and use the same.

This invention relates to disk drills, namely, drills of the type in which the head is provided with substantially disk-shaped cutters that form a hole by a scraping or skiving action, the cutters being arranged in an upright position and projecting laterally from the head so that the edge portion of same will scrape off the material from the side wall of the hole when the head is rotated.

The main object of my present invention is to provide a disk drill that is equipped with a plurality of gangs of disk-shaped cutters arranged in different horizontal planes, the cutters at the lower end of the head acting to form the bottom of the hole and the gang or gangs of cutters that are arranged above the bottom gang of cutters acting to maintain the clearance for the drill and also to break up the large pieces of material that are scraped off of the side wall of the hole.

Another object is to provide an efficient reaming disk drill of simple construction that can be manufactured at a low cost. And still another object is to provide a strong and serviceable reaming disk drill which is so constructed that ample space is provided between the drill and the side walls of the hole for the material that the flushing water forces upwardly past the drill head, when the drill is in operation, thereby producing a drill that can be used effectively in soft or sticky formations which cannot be drilled rapidly with disk drills of the type heretofore in general use, owing to the tendency of the material to become wadded around the drill.

Other objects and desirable features of my invention will be hereinafter pointed out.

Figure 1:
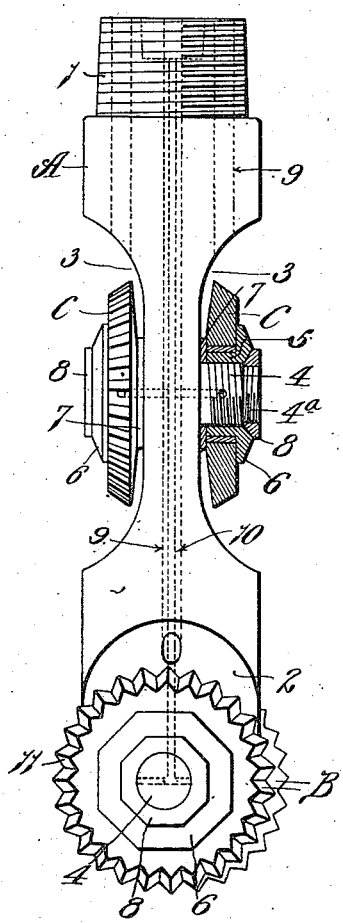
Figure 2:
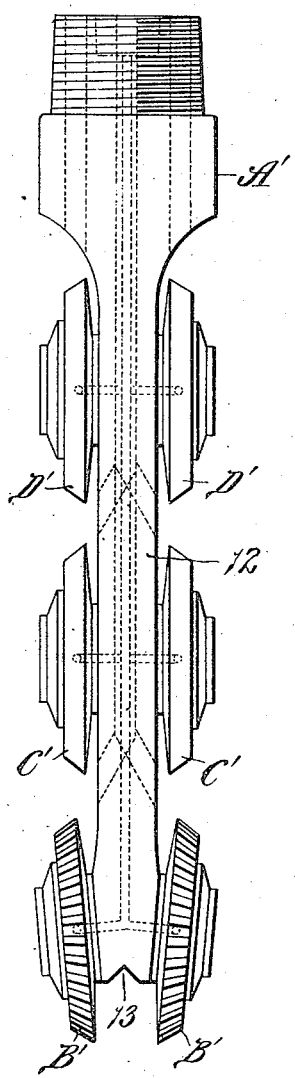
Figure 3:
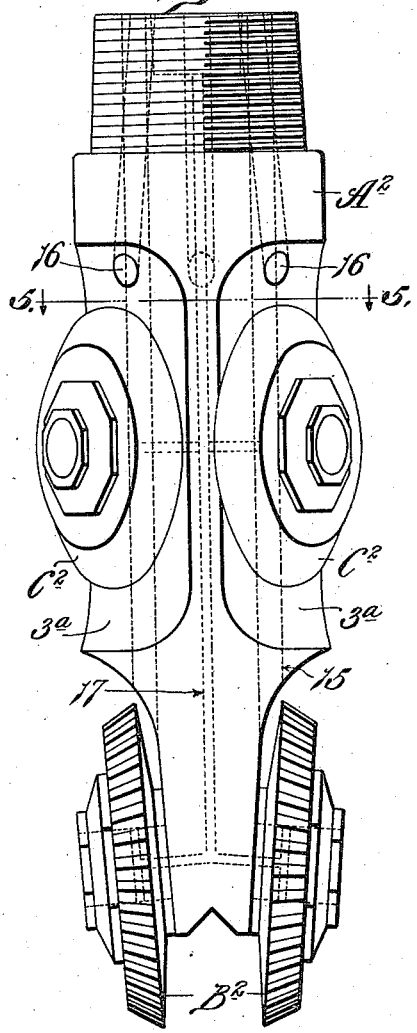
Figure 4:
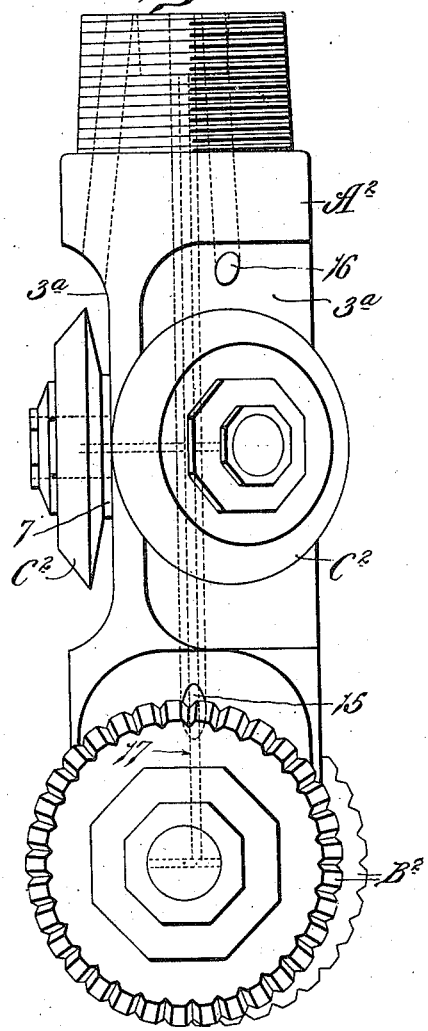
Figure 5:
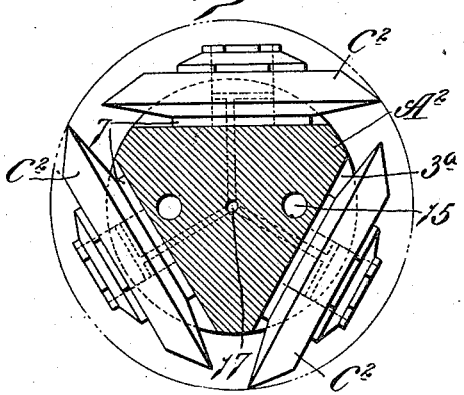
Figure 6:
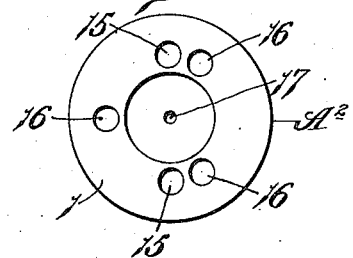

Figure 1 of the drawings is a side elevational view of a disk drill embodying my invention. Fig. 2 is a side elevational view, illustrating another form of my invention. Fig. 3 is a side elevational view, illustrating still another form. Fig. 4 is a side elevational view, taken at right angles to Fig. 3. Fig. 5 is a horizontal sectional view, taken on the line 5—5 of Fig. 3; and Fig. 6 is a top plan view of the drill head shown in Fig. 3.

Referring to the drawings, A designates the head of the drill which is provided at its upper end with an externally screw-threaded portion 1 for enabling the drill to be connected to a hollow drill stem (not shown). The head or shank of the drill is provided with a plurality of gangs of disk-shaped cutters arranged in different horizontal planes, the cutters at the lower end of the head operating on the bottom of the hole and on the adjacent portion of the side wall of the hole, and the cutters that are arranged above the bottom cutters operating on the side wall of the hole.

In the drill shown in Fig. 1 two substantially disk-shaped cutters B are arranged on opposite sides of a reduced extension at the lower end of the head A, said extension being preferably produced by forming recesses 2 in the opposite side faces of the head A, thereby causing portions of the head to project laterally over the cutters B and partially protect same. A second set or gang of cutters C is arranged on the head A in a higher horizontal plane than the plane in which the cutters B lie, the cutters C being arranged in recesses or pockets 3 formed in the sides of the head, so that the cutters C will be partially protected by the head in the same manner as the bottom gang of cutters B. If desired, the head A could be made longer and other gangs of cutters could be arranged on same above the cutters C, so as to produce a long head or shank provided throughout its entire length with gangs of substantially disk-shaped cutters. It is immaterial how the cutters are mounted, but one type of cutter mounting that I have found to be very efficient consists of a spindle 4 formed integral with the head and provided with a removable bearing 5 that has a head or cap portion 6 that projects over the outer side of the cutter, and thus prevents the cutter from moving outwardly away from a washer 7 that is arranged between the inner side of the cutter and the head of the drill, as shown in Fig. 1, said bearing 5 being screwed onto the spindle and securely locked in operative position by means of a jam nut 8 that is mounted on an oppositely-screw-threaded, reduced portion 4ᵃ at the outer end of the spindle. The cutters constituting each set or gang of cutters are preferably staggered or offset slightly with relation to each other, as shown in Fig. 1, so that only one portion of the edge of each cutter will act on the side wall of the hole at the same time, and in the drill shown in Fig. 1 the cutters C are arranged at approximately a right angle to the cutters B. The head A is provided with water courses 9, as shown in dotted lines in Fig. 1, from which jets of flushing water are discharged downwardly onto the cutters B and C, and lubricating ducts 10 are formed in the head and in the cutter-supporting spindles, so as to supply a lubricating medium to the bearings on which the cutters turn.

When the drill is in operation the cutters B at the lower end of same cut the material at the bottom of the hole, and the gang or gangs of cutters that are arranged on the head at a higher point act on the side wall of the hole, and thus maintain the clearance for the drill and also hold the drill straight and prevent it deflecting from a straight line when the cutters B at the lower end of the head strike a boulder or encounter a crevice in the formation through which the drill is passing. It is immaterial what particular kind of cutting surface the cutters are provided with, but I prefer to bevel the edges of the cutters slightly and form transverse teeth 11 on same, as shown in Fig. 1, so that the cutters will be sure to rotate when the drill is in operation, thus bringing different portions of the cutters in position to act on the side wall of the hole.

A drill of the construction above described is particularly adapted for use in gumbo, shale and other soft formations, owing to the fact that the relatively large recesses or pockets in the side faces of the head in which the cutters are mounted provide ample clearance for the disintegrated material that the flushing water forces upwardly past the head of the drill. There is little liability of the hole losing its gage, as the cutters at the lower end of the head are not depended upon to form the clearance for the head, but, on the contrary, the clearance is maintained by one or more groups of cutters that are subjected to comparatively little wear, owing to the fact that they act only on the side wall of the hole. Any large chunks or strips of material that are scraped off without being broken up by the cutters at the lower end of the head will be whipped up or broken into such small particles by the upper gang of cutters that the flushing water will be sure to dissolve said material. The drill shown in Fig. 2 embodies practically the same features and characteristics of the drill shown in Fig. 1, but it is provided with three gangs of cutters B', C', and D' arranged in different horizontal planes and with the cutters at each side of the head in vertical alinement with each other. The head A' is provided with a relatively long and narrow shank 12 of substantially oblong shape in cross section, and at the lower end of said shank is a stationary cutting device arranged between the bottom cutters B' and preferably consisting of an inverted V-shaped groove 13. The head A' is preferably provided with a cutter mounting of the type shown in Fig. 1, or of any other suitable form that will provide relatively large bearing surfaces on which the cutters turn. While it is immaterial what particular type of cutter mounting is used, still, I prefer to use a cutter mounting that comprises a spindle which is integrally connected to the head, said head being formed from a straight shaft or bar of metal provided in its side faces with recesses or cut-out portions for receiving the cutters. The cutters B' at the lower end of the head can either be arranged in parallel position or they can be inclined slightly, as shown in Fig. 2.

The drill shown in Figs. 3 to 6, inclusive, is provided with a bottom gang of cutters consisting of two substantially disk-shaped cutters $B^2$ and one or more gangs of cutters arranged in a higher horizontal plane and each comprising three substantially disk-shaped cutters $C^2$, the bottom cutters being arranged on opposite sides of a reduced portion at the lower end of the head and the cutters $C^2$ being arranged in recesses or pockets 3ᵃ. Each cutter is preferably mounted on a spindle that is integrally connected to the head and the cutters $C^2$ that constitute the top gang of cutters are arranged on the head in such a manner that only one edge portion of each cutter $C^2$ will act on the side wall of the hole at the same time. The portion of the head $A^2$ on which the cutters $C^2$ are arranged is substantially triangularly-shaped in cross section, as shown in Fig. 5, so that flat bearing surfaces will be provided for the washers 7 which are interposed between the head and the inner sides of the cutters $C^2$. In all forms of my invention the head is provided with water courses and with lubricating ducts for well known purposes. In the drill shown in Figs. 3 to 6 the head is provided with two water courses 15 that lead downwardly from the upper end of the head and terminate in proximity to the bottom cutters $B^2$, so that jets of flushing water will be discharged onto said cutters. Water courses 16 also lead downwardly from the upper end of the head and terminate in proximity to the cutters $C^2$, as shown in Figs. 3 and 4, so that jets of flushing water will be discharged onto said cutters. A lubricating duct 17 that extends longitudinally through the head and which coöperates with branch ducts that lead to the bearings on which the cutters turn makes it possible to keep the cutters thoroughly lubricated when the drill is in operation. The cutters in all forms of my invention may be provided with any suitable type of cutting surface, and while the spindles on which the cutters are mounted are herein described as being formed integral with the head, I wish it to be understood that my invention is not limited to this particular construction, as said spindles could be detachably connected to the head without departing from the spirit of my invention.

Having thus described my invention, what I claim, and desire to secure by Letters Patent, is:

1. A disk drill consisting of a rotatable head provided with gangs of substantially disk-shaped cutters that are arranged vertically in different horizontal planes on the outer side of the head.

2. A disk drill consisting of a rotatable head and a plurality of gangs of cutters arranged on said head in different horizontal planes, each of said gangs comprising a plurality of substantially disk-shaped cutters which are arranged on the outside of the head in a vertical position so that the edge portions of same will scrape off the material at the side wall of the hole when the head revolves.

3. A disk drill comprising a rotatable head provided with a plurality of gangs of substantially disk-shaped cutters arranged in different horizontal planes, the head being provided in its outer surface with pockets and each gang comprising a plurality of cutters that are arranged in a vertical position in said pockets.

4. A disk drill comprising a rotatable head provided with a plurality of gangs of disk-shaped cutters arranged in different horizontal planes, said cutters being mounted on the outer side of the head in a vertical position so that the edges of same will scrape off the material at the side of the hole and the head being provided with portions that project laterally over said cutters so as to partially protect same.

5. A disk drill comprising a head provided with a plurality of gangs of substantially disk-shaped cutters that are arranged vertically in different horizontal planes so that the edge portions of same will scrape off the material from the side wall of the hole when the head revolves, integral spindles on the head on which said cutters are mounted, and cut-out portions in the outer surface of the head for receiving said cutters.

6. A disk drill consisting of a relatively long head provided with a plurality of gangs of substantially disk shaped cutters located in different horizontal planes and each composed of a plurality of substantially vertically-disposed cutters arranged in such a manner that the edge portions of same will scrape off the material at the side wall of the hole when the head revolves.

7. A disk drill consisting of a head provided at its lower end with a cutting means, and a reaming means arranged at a higher point on the head and consisting of three substantially disk-shaped cutters that are set in an upright position in the same horizontal plane and arranged at an angle to each other so that the edge portions of same will scrape off the material at the side wall of the hole when the head revolves.

8. A disk drill consisting of a head provided at its lower end with a cutting means, said head having a portion of substantially triangular shape in cross section that is arranged in a higher horizontal plane than said cutting means, and rotatable cutting disks arranged in an upright position on spindles that project laterally from the outer faces of the triangularly-shaped portion of said head.

9. A disk drill comprising a head provided at its lower end with a cutting means and three substantially disk-shaped cutters arranged in an upright position at a higher point on the head in recesses formed in the outer surface of the head and located in the same horizontal plane.

In testimony whereof I hereunto affix my signature in the presence of two witnesses, this 19th day of July, 1915.

HOWARD R. HUGHES.

Witnesses:
LAURA KELLEY,
CATHERINE HARRINGTON.